(12) United States Patent
Lee et al.

(10) Patent No.: US 8,069,280 B2
(45) Date of Patent: Nov. 29, 2011

(54) DIRECT MEMORY ACCESS APPARATUS FOR SENDING DATA STORED IN MEMORY SEPARATELY FROM AN OPERATION OF A MAIN PROCESSOR AND DIRECT MEMORY ACCESS METHOD USING THE SAME

(75) Inventors: Hwang-Soo Lee, Daejeon (KR); Jung-Keun Kim, Daejeon (KR); Il-Song Han, Daejeon (KR); Young Serk Shim, Daejeon (KR)

(73) Assignee: Korea Advanced Institute of Science & Technology, Daejeon (KR)

( * ) Notice: Subject to any disclaimer, the term of this patent is extended or adjusted under 35 U.S.C. 154(b) by 117 days.

(21) Appl. No.: 12/626,857

(22) Filed: Nov. 27, 2009

(65) Prior Publication Data

US 2010/0131678 A1    May 27, 2010

(30) Foreign Application Priority Data

Nov. 27, 2008  (KR) .................. 10-2008-0118951

(51) Int. Cl.
*G06F 13/28* (2006.01)
(52) U.S. Cl. .................................... 710/22
(58) Field of Classification Search .................. 710/22
See application file for complete search history.

(56) References Cited

U.S. PATENT DOCUMENTS

| | | | |
|---|---|---|---|
| 6,754,732 B1* | 6/2004 | Dixon et al. | 710/22 |
| 2005/0223136 A1* | 10/2005 | Tanaka et al. | 710/22 |
| 2007/0192515 A1* | 8/2007 | Kraus | 710/22 |

* cited by examiner

*Primary Examiner* — Alford W. Kindred
*Assistant Examiner* — David Martinez
(74) *Attorney, Agent, or Firm* — Harry K. Ahn; Abelman Frayne & Schwab (57) ABSTRACT

There is provided a direct memory access apparatus and a direct memory access method.

The direct memory access apparatus of the present invention comprises: a variable transmission rule map unit for setting a transmission rule with a variable block length and a variable block interval as a unit of memory transmission rule; a direct memory access unit for sending data line of the variable block length and the variable block interval, in case of access to the unit of memory by using the unit of memory transmission rule determined by the variable transmission rule map unit; and an interface unit for retrieving the unit of memory transmission rule, which is necessary for sending the data line of the variable block length and the variable block interval, from the variable transmission rule map unit and sending the unit of memory transmission rule to the direct memory access unit.

12 Claims, 8 Drawing Sheets

DIRECT MEMORY ACCESS APPARATUS FOR SENDING DATA STORED IN MEMORY SEPARATELY FROM AN OPERATION OF A MAIN PROCESSOR AND DIRECT MEMORY ACCESS METHOD USING THE SAME

BACKGROUND OF THE INVENTION

1. Technical Field

The present invention relates to a direct memory access apparatus and a direct memory access method.

2. Discussion of Related Art

Direct Memory Access (DMA) apparatus transmits data stored in memory independently from a processor and is widely used as a peripheral apparatus.

Generally, the direct memory access operation is used to move data block distributed with consecutive addresses such as a source address, a destination address and length field.

Figure 1:
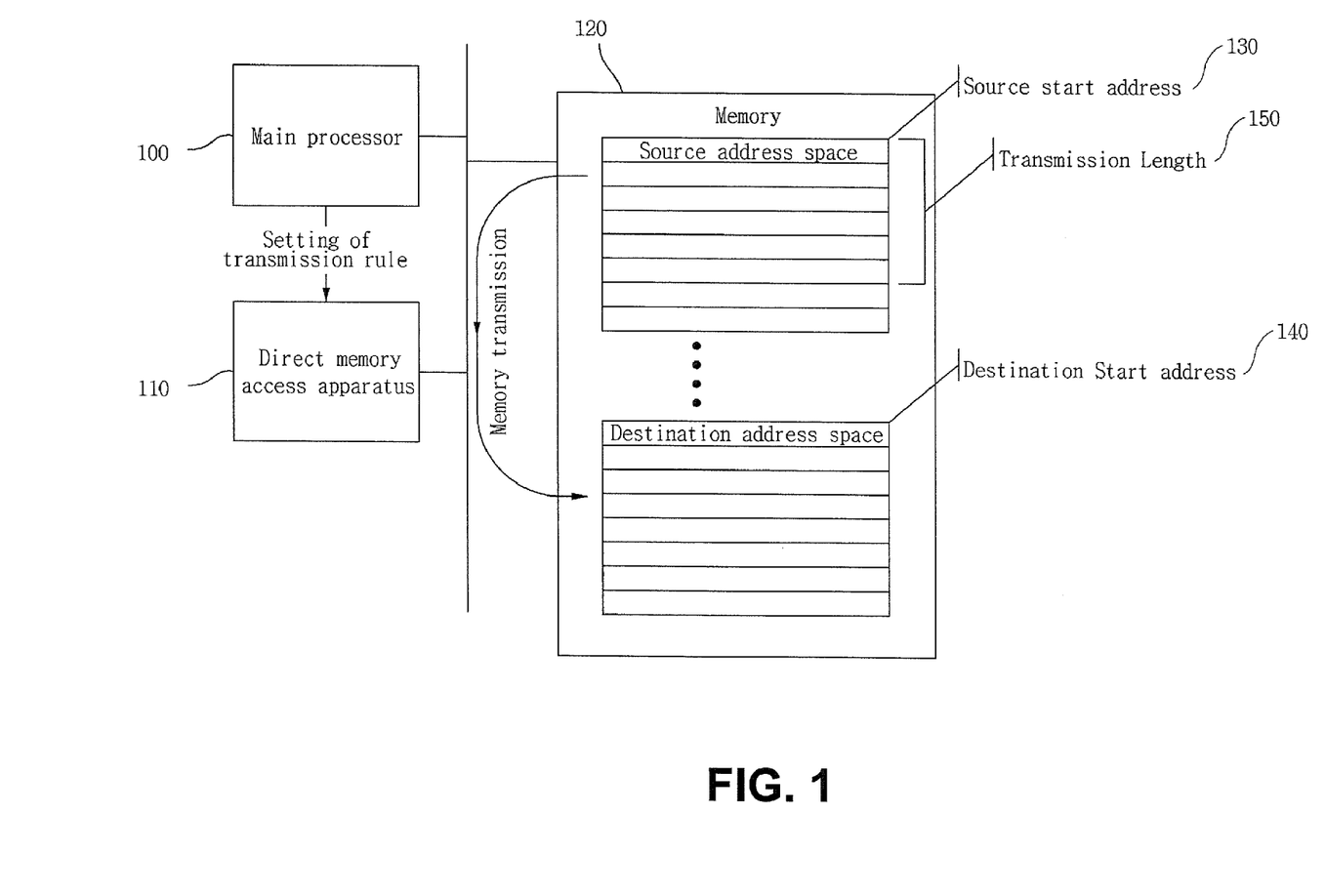
FIG. 1 is a block diagram for describing an operation of a direct memory access apparatus according to a conventional technique.
Figure 2:
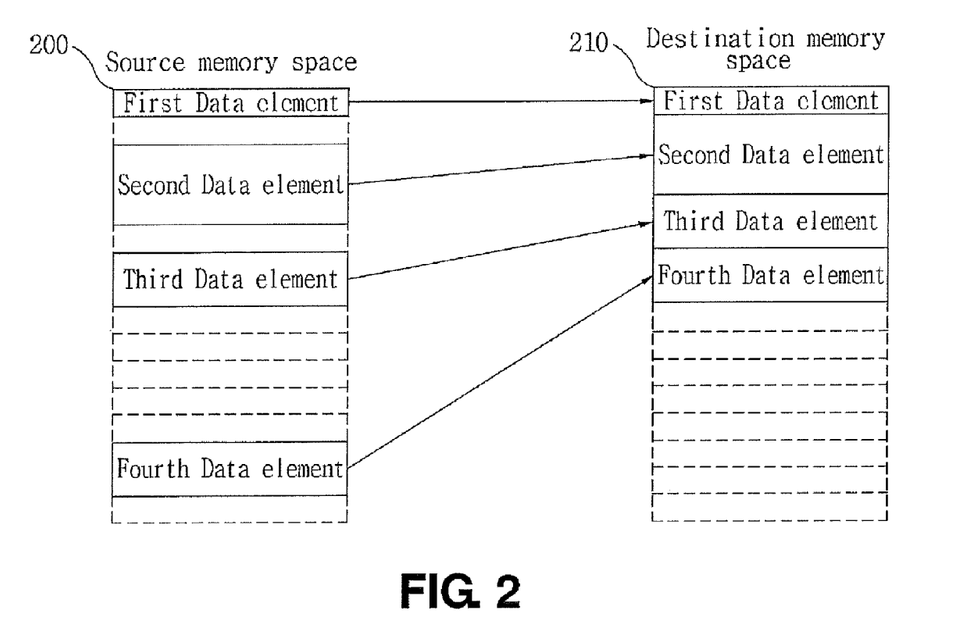
FIG. 2 is a block diagram for describing transmission operation of data line complicatedly distributed in memory by the conventional method according to a conventional technique.

FIG. 1 is a block diagram for describing an operation of a direct memory access apparatus according to a conventional technique, and FIG. 2 is a block diagram for describing transmission operation of data line complicatedly distributed in memory according to a conventional technique.

As shown in FIG. 1, a main processor 100 determines a transmission rule in a memory 120 with which a direct memory access apparatus 110 will perform in an applied program through a source address 130, a destination address 140 and a transmission length 150. In case a trigger source of the transmission rule is determined (not shown), when a particular trigger source occurs, a transmission operation from the source address to the destination address is performed independently from the main processor. The direct memory transmission operation like this is effective to the transmission operation of data line distributed with a certain length and a certain interval or data line distributed in consecutive memories.

However, as shown in FIG. 2, an operation for transmitting data line distributed in memory with a nonuniform interval and/or a nonuniform length in a source memory space 200 and/or a destination memory space 210 is not capable of being transmitted with one time rule and requires a plurality of transmission rule serialized in the transmission of each data element and needs a frequent operation of the main processor. In addition, this conventional transmission operation causes frequent interruption to deteriorate an effect of the direct memory transmission. Meantime, when considering an operation with the main processor excluding the direct memory access apparatus, since the above complex memory access causes frequent cache miss, using the direct memory access apparatus is advantageous. Therefore, an operation which has rules of variable length decoding, hashing, an assignment of subcarrier in OFDMA and which is inappropriate by a simple block transmission requires a transmission by the direct memory access apparatus which is capable of sending data line of variable length and interval at one time setting.

SUMMARY OF THE INVENTION

Therefore, the present invention is conceived to solve the aforementioned problems. The present invention provides a direct memory access apparatus and a direct memory access method capable of transmitting sequence having various intervals and various lengths as well as successive data stored in the memory, by transmitting data line having complex rules distributed in the memory using one setting of transmission rule.

In addition, the present invention also provides a direct memory access apparatus and a direct memory access method capable of transmitting data line distributed in the memory with a variable interval and length by direct memory access.

The present invention also provides a direct memory access apparatus and a direct memory access method capable of reducing interruption frequency and frequent demand for setting, which may occur in case data line is transmitted at the background of the main processor.

In addition, the present invention also provides a direct memory access apparatus and a direct memory access method capable of allowing memory access having a complex rule with memory of a variable block length and a variable interval, which is difficult in the conventional direct memory access apparatus, and thus capable of reducing effectively a burden of a memory access cycle of the main processor.

A direct memory access apparatus for sending data stored in memory separately from an operation of a main processor related to claim 1, comprises: a variable transmission rule map unit for setting a transmission rule with a variable block length and a variable block interval as a unit of memory transmission rule; a direct memory access unit for sending data line of the variable block length and the variable block interval, in case of access to the unit of memory by using the unit of memory transmission rule determined by the variable transmission rule map unit; and an interface unit for retrieving the unit of memory transmission rule, which is necessary for sending the data line of the variable block length and the variable block interval, from the variable transmission rule map unit and sending the unit of memory transmission rule to the direct memory access unit.

A direct memory access apparatus related to claim 2 is the direct memory access apparatus related to claim 1, wherein the variable transmission rule map unit is accessible by the main processor and the interface unit; and the variable transmission rule map unit comprises a transmission descriptor number field having transmission descriptors to be transmitted; a first transmission descriptor pointer field for showing a position of the first transmission descriptor; and a transmission descriptor arrangement field having a plural of the unit transmission descriptor as many as the transmission descriptor number fields.

A direct memory access apparatus related to claim 3 is the direct memory access apparatus related to claim 2, wherein the unit transmission descriptor comprises a source data address field; a destination data address field; a source data interval field; a destination data interval field; and a data length field.

A direct memory access apparatus related to claim 4 is the direct memory access apparatus related to claim 2, wherein the field of the variable transmission rule map unit is programmed by the main processor.

A direct memory access apparatus related to claim 5 is the direct memory access apparatus related to claim 1, wherein the direct memory access unit comprises a source start address register; a destination start address register; a source address generator; a destination address generator; and a transmission length register.

A direct memory access apparatus related to claim 6 is the direct memory access apparatus related to claim 1, wherein the interface comprises a transmission rule map and descriptor parameter patch unit; a transmission descriptor count register; and a data element count register.

A direct memory access method related to claim 7 is the direct memory access method using the direct memory access apparatus related to claim 1, wherein the direct memory access method comprises the steps of: (a) storing a start address of data line which is transmitted; (b) storing a start address of a memory position where the data line is stored; and (c) determining an actual address and sending the data line after receiving an increase unit and a transmission length of the address from the stored start address register.

A direct memory access method related to claim 8 is the direct memory access method using the direct memory access apparatus related to claim 1, wherein an operation of the interface unit comprises steps of: (a) receiving a transmission command from the main processor after a transmission rule map is set by the main processor, and reading the number of the transmission descriptors from the transmission rule map unit; (b) reading a position of the first transmission rule descriptor; (c) initializing the transmission operation of the direct memory access unit; (d) setting a source and a destination register of the direct memory access unit by using a source and a destination start address setting which are read by the transmission rule descriptor; (e) setting the data elements number register which is read from the transmission rule map unit; (f) sending parameters read from the transmission rule descriptor to the direct memory access apparatus, and adding a corresponding parameter to the predetermined source and destination register value to update an address of a corresponding data line and setting a source data interval, a destination data interval, and data length; (g) determining on whether to exceed a count of number of data elements; and (h) determining on whether to exceed a count of number of the transmission descriptors in case the count of number of the data elements is exceeded.

A direct memory access method related to claim 9 is the direct memory access method related to claim 8, wherein the (g) step repeats the setting of the source data interval and the destination data interval and the data length as many times as number of the data elements in case the count of number of the data elements is not exceeded.

A direct memory access method related to claim 10 is the direct memory access method related to claim 8, wherein the eight step comprises the steps of terminating the operation of the interface when a count of number of the transmission descriptors is exceeded; and repeating the (c) step to the (h) step after reading a position of next transmission descriptor as many times as the predetermined number of the transmission descriptors in case the count of the number of the transmission descriptors is not exceeded.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. The same reference number can be used for the common parts between the embodiments.

Figure 3:
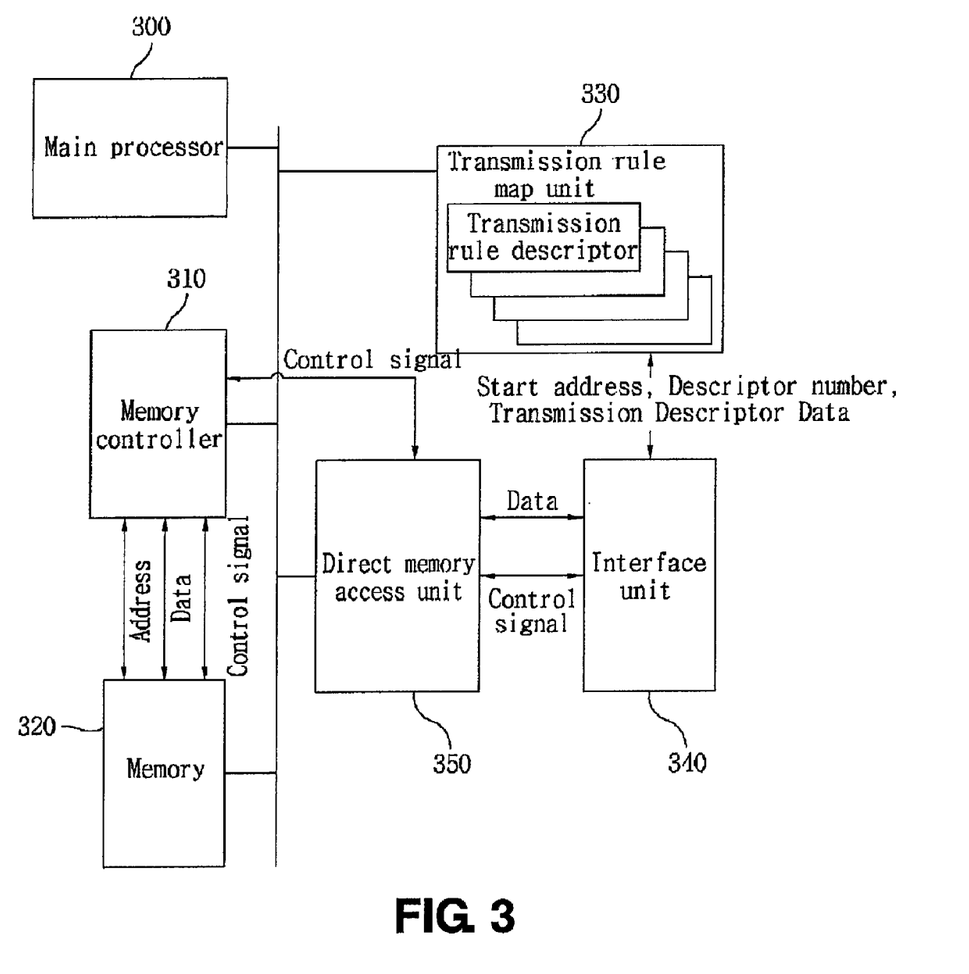
FIG. 3 is a block diagram for describing a structure of a direct memory access apparatus according to an embodiment of the present invention.
Figure 4:
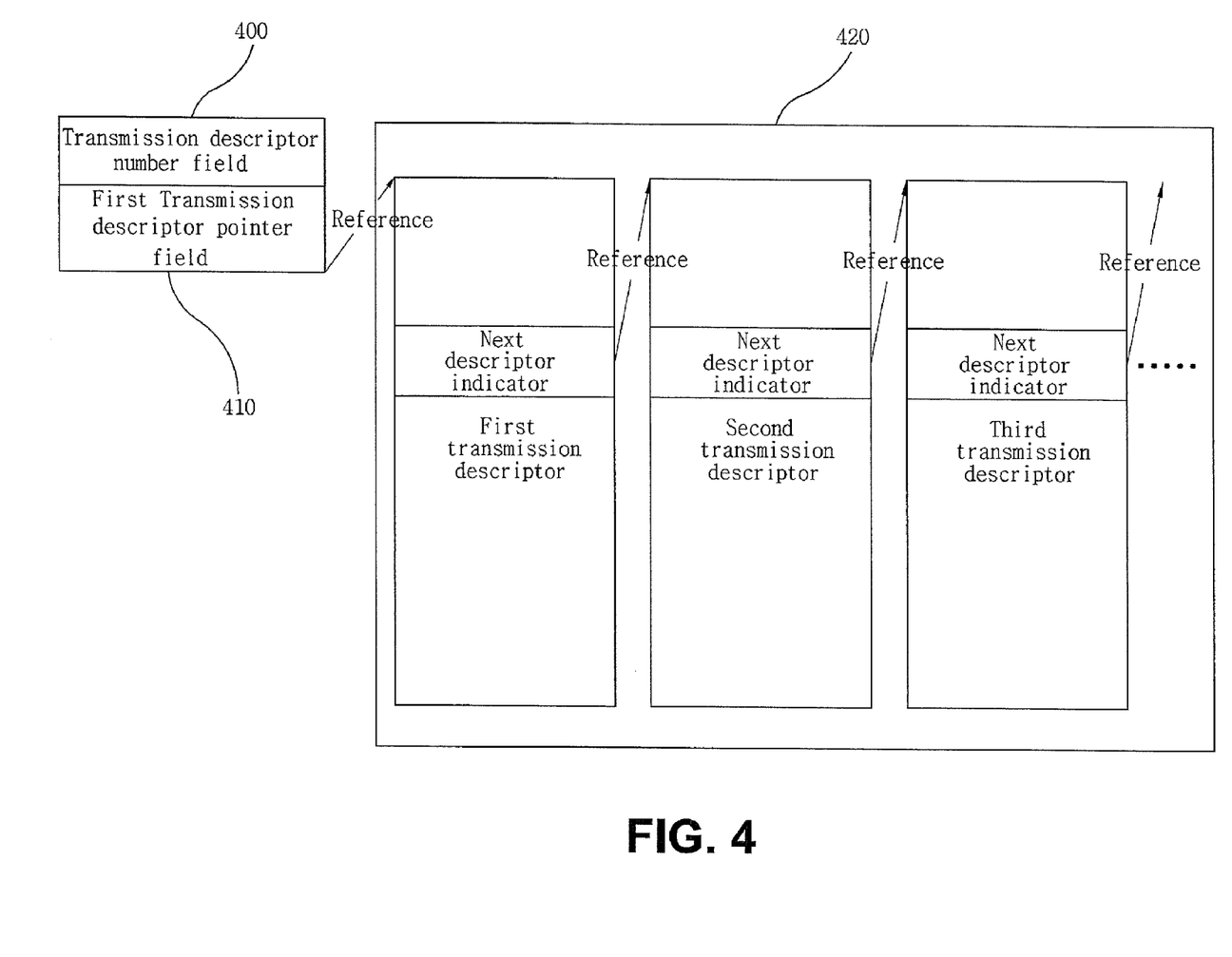
FIG. 4 is a block diagram for describing a structure of a transmission rule map according to the embodiment of the present invention.
Figure 5:
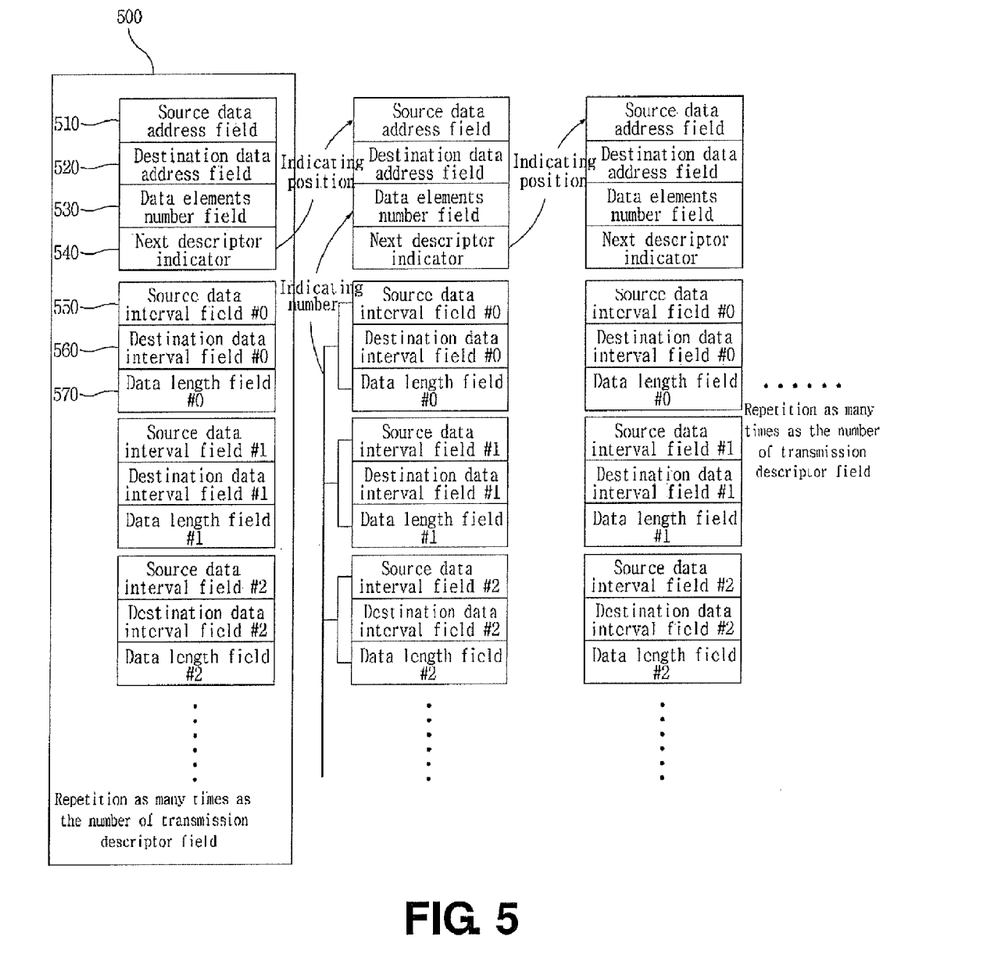
FIG. 5 is a block diagram for describing a structure of a transmission descriptor arrangement according to the embodiment of the present invention.

FIG. 3 is a block diagram for describing a structure of a direct memory access apparatus according to an embodiment of the present invention. FIG. 4 is a block diagram for describing a structure of transmission rule map according to the embodiment of the present invention. FIG. 5 is a block to diagram for describing a structure of a transmission descriptor arrangement according to the embodiment of the present invention.

As shown in FIG. 3 to FIG. 5, the direct memory access apparatus of the embodiment of the present invention comprises a variable transmission rule map unit 330, a direct memory access unit 350, and an interface unit 340. In addition, the direct memory access apparatus further includes a main processor 300, a memory 320 for storing data, and a memory controller 310 for controlling transmission of data stored in the memory 320, provision of address and control signal.

The direct memory access apparatus of FIG. 3, when the main processor needs data transmission by the direct memory access unit 350, sets a transmission rule map including the transmission descriptor, and the interface unit 340 reads parameter data in the transmission rule map unit 330 which is necessary for transmitting memory by the direct memory access unit 350, and sends the parameter data. Meanwhile, description of the structures of the direct memory access apparatus will be described in detail in FIG. 8.

The transmission rule map of FIG. 4 is a register or memory space which is accessible simultaneously by the main processor and the interface. The transmission rule map comprises a transmission descriptor number field 400, a first transmission descriptor pointer field 410, a transmission descriptor arrangement 420. The transmission descriptor number field 400 is used for indicating a total number of the transmission descriptor, and the first transmission descriptor pointer field 410 is a field for showing a position of the first transmission descriptor of the transmission descriptor arrangement 420. In addition, the transmission descriptor arrangement 420 comprises transmission descriptors as many as transmission descriptor number field 400. All fields of the transmission rule map is set by a program of the main processor 300 of FIG. 3, and interface unit 340 reads the set fields.

A transmission descriptor arrangement of FIG. 5 sets a rule for transmitting a unit of data line by the direct memory access unit. The transmission descriptors 500 of FIG. 5 are included in the arrangement as many as the transmission descriptor number field 400 of FIG. 4.

Each transmission descriptor 500 includes a source data address field 510, a destination data address field 520, a data elements number field 530, a next descriptor indicator 540, a source data interval field 550, a destination data interval field 560, and a data length field 570. Meanwhile, all fields of the transmission rule map is set by a program of the main processor 300 of FIG. 3, and all the fields are read by the interface unit 340.

Figure 6:
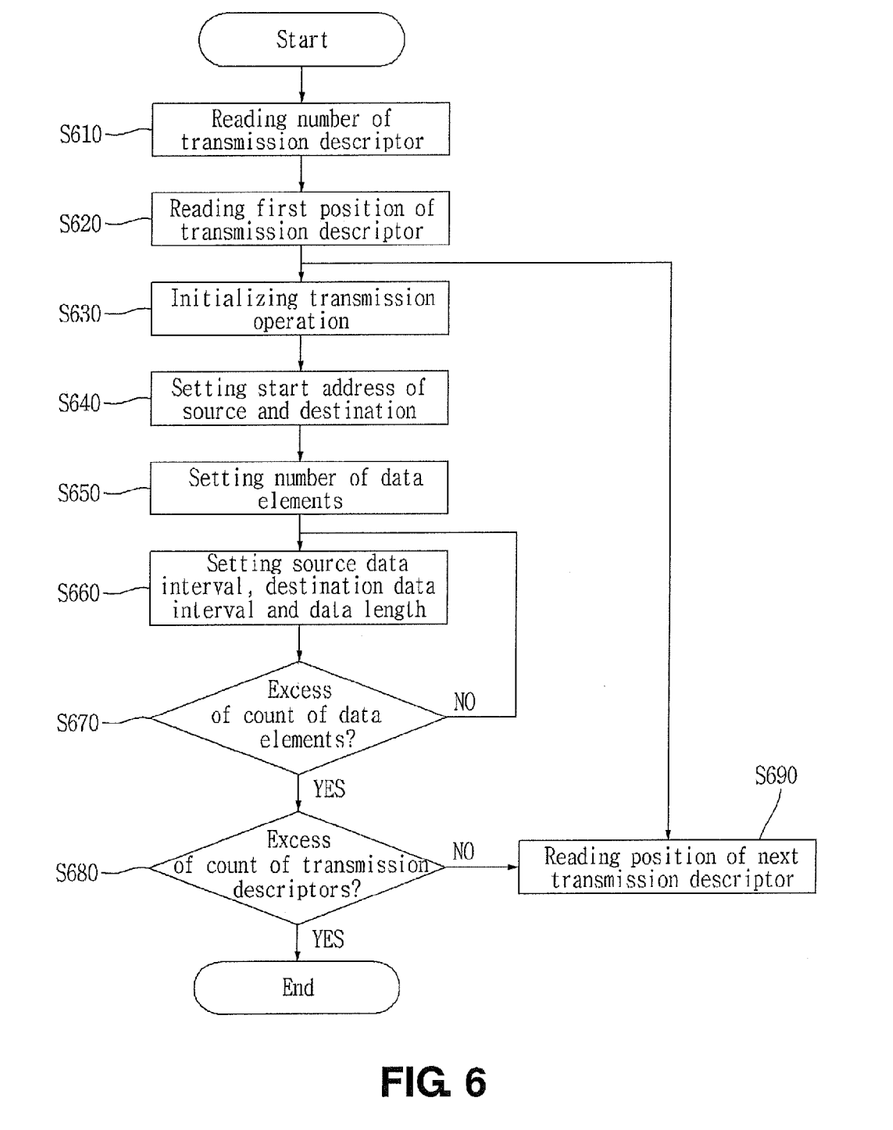
FIG. 6 is a flow chart for describing a sequence of an operation of the interface unit according to the embodiment of the present invention.
Figure 7:
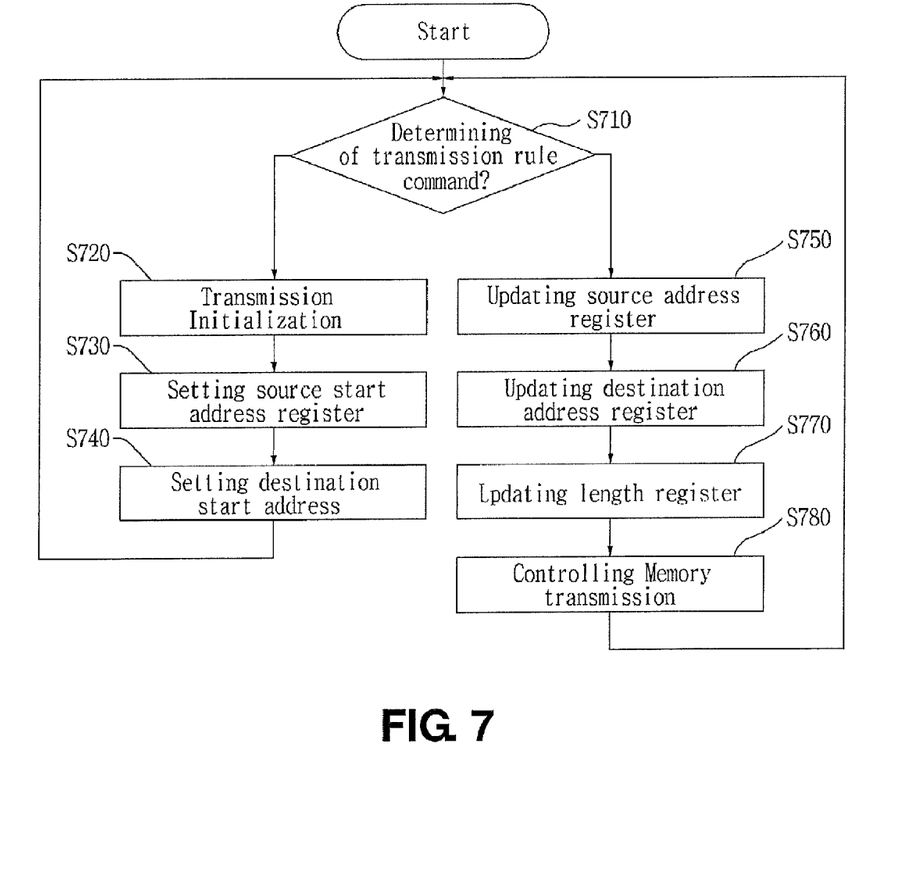
FIG. 7 is a flow chart for describing a sequence of an operation of the direct memory access unit according to the embodiment of the present invention.
Figure 8:
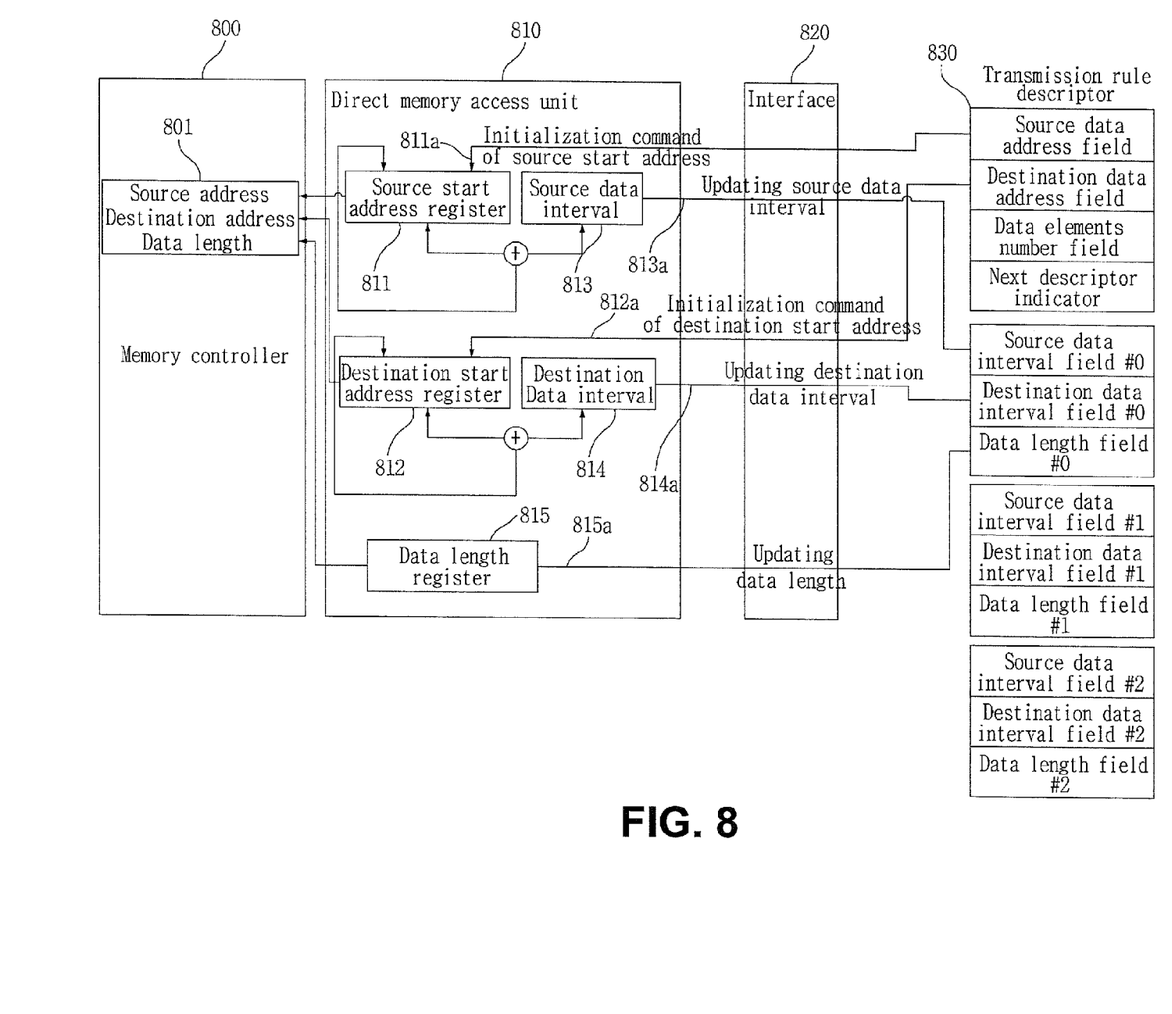
FIG. 8 is a block diagram for showing an interface relation of the memory controller, the direct memory access unit, the interface unit and transmission rule descriptor.

FIG. 6 is a flow chart for describing a sequence of an operation of the interface unit according to the embodiment of the present invention, and FIG. 7 is a flow chart for describing a sequence of an operation of the direct memory access unit according to the embodiment of the present invention. FIG. 8 is a block diagram for showing an interface relation of the memory controller, the direct memory access unit, the interface unit and transmission rule descriptor.

As shown in FIG. 6, the operation of the interface unit according to the embodiment of the present invention comprises a first step S610 for reading a number of the transmission descriptor, a second step S620 for reading a position of the first transmission rule descriptor, a third step S630 for initializing a transmission operation of the direct memory access unit, a fourth step S640 for setting a source and a destination start address of the direct memory access unit, a fifth step S650 for setting the number of data elements, a sixth step S660 for setting a source data interval, a destination data interval, and data length, a seventh step S670 for determining on whether to exceed the count of the number of data elements, and an eighth step S680 for determining on whether to exceed the count of the number of the transmission descriptor.

In more detail, in the first step S610, the main processor instructs a transmission after setting a transmission rule map. And then, the interface unit reads the number of transmission descriptor in the transmission rule map and sets up a register of the number of transmission descriptor.

In the second step S620, the transmission rule map interface apparatus reads and recognizes a position of the first transmission rule descriptor.

Subsequently, the interface unit repeats the transmission operation S630-S690 by the transmission rule descriptor as many times as the number of the transmission descriptor which is read in the first step S610. In other words, the third step S630 is a first step of the transmission control by the transmission rule descriptor, and the third step initializes the transmission operation of the direct memory access unit.

In the fourth step S640, a source and destination start address, which is read in the transmission rule descriptor, are set through a control signal of the interface unit, and a source and destination register in the direct memory access unit is set.

In the fifth step S650, the number of data elements which is read in the transmission rule map is determined, and the register of the number of data elements is set.

In the sixth step S660 of setting a source data interval, a destination data interval and a data length, corresponding parameters which are read in the transmission rule descriptor are transmitted to the direct memory access unit through the control signal of the interface unit, and the corresponding interval parameter is added to the predetermined source and destination register value, and then a corresponding data line address is updated. Here, a corresponding data length is also determined through a control signal of the interface unit. In the seventh step S670 of determining on whether to exceed a count of data elements, the setting operation S660 is repeated many times as the number of data elements of the fifth step S650. The operation terminates after many repetitions as the number of data elements.

In the eighth step S680 of determining on whether to exceed a count of the transmission descriptor in case of exceeding the count of the data elements, the third to eighth step S630-S680 including a step S690 of reading a position of next transmission descriptor are repeated as many times as the number of transmission descriptor which is read in the first step S610.

A method for operating the direct memory access unit according to the embodiment of the present invention shown in FIG. 7 is described in reference to an interface relation of a memory controller 800, a direct memory access unit 810, an interface 820 and a transmission rule descriptor 830 shown in FIG. 8.

The direct memory access unit 810 is transmitted with a transmission rule command from the interface unit 820 through a control signal. The transmitted command is determined if it is an initialization command or an update command in a step of determining transmission rule command S710.

In case an initialization command is transmitted, a transmission which has been performed up to the present is initialized in a step S720, and a step of setting a source start address register S730 and a step of setting a destination start address register S740 are performed successively. In the step of setting a source start address register S730, the interface unit 820 reads a transmission descriptor 830 and transmits the transmission descriptor 830 through a control signal, and then an initialization with a source start address value 811*a* is performed. It is on standby for a next update command.

In case an update command is transmitted, a step of updating source address S750, a step of updating destination address S760, a step of updating transmission length S770, and a step of controlling memory transmission S780 are performed successively.

In the step of updating source address register S750, a source data value 813 which the interface unit has sent by reading the transmission descriptor 830 is added to a value stored in a source start address register 811, and then the source start address register value is updated.

In the step of updating destination address register S760, the destination data interval value 814 which the interface 820 has sent by reading the transmission descriptor 830 is added to a value stored in a destination start address register 812, and then the destination start address register is updated 814*a*.

In the step of updating transmission length register S770, a data length register 815 is updated 815*a* to a data length value 815 which the interface unit 820 has sent by reading the transmission descriptor 830. Through the step of updating source address S750, the step of updating destination address S760 and the step of updating transmission length S770, the direct memory access unit 810 transmits a corresponding memory to the memory controller 800 by a control signal 801 based on the updated register values.

Since the direct memory access apparatus and the direct memory access method according to the present invention can transmit data line, which has complex rules distributed in the memory using one setting of transmission rule, to the present invention can transmit sequence having a variable interval and a variable length as well as successive data stored in the memory. The present invention can transmit data line distributed in memory with various intervals and lengths by direct memory access. In addition, the present invention can reduce interruption frequency and frequent demand for setting, which may occur in case data line is transmitted at the background of the main processor. The present invention can allow memory access of a complex rule with memory of a variable block length and a variable interval, which is difficult in the conventional direct memory access apparatus, and thus reducing effectively a burden of memory access cycle of the main processor.

While preferred embodiments of the invention have been described, it will be understood by persons skilled in the art that various changes and modifications may be made without departing from the spirit and scope of the invention which is defined by the following claims. It is understood that the above-described preferred embodiments are only illustrative of the present invention and are not to be construed as being limitative.

What is claimed is:

1. A direct memory access apparatus for sending data stored in memory separately from an operation of a main processor comprising:
   a variable transmission rule map unit for setting a transmission rule with a variable block length and a variable block interval as a unit of memory transmission rule;
   a direct memory access unit for sending data line of the variable block length and the variable block interval, in case of access to the unit of memory by using the unit of memory transmission rule determined by the variable transmission rule map unit; and
   an interface unit for retrieving the unit of memory transmission rule, which is necessary for sending the data line of the variable block length and the variable block interval, from the variable transmission rule map unit and sending the unit of memory transmission rule to the direct memory access unit, wherein the interface unit comprises a transmission rule map and descriptor parameter patch unit, a transmission descriptor count register and a data element number register.

2. The direct memory access apparatus according to claim 1, wherein the variable transmission rule map unit is accessible by the main processor and the interface unit; and the variable transmission rule map unit comprises: a transmission descriptor number field having transmission descriptors to be transmitted; a first transmission descriptor pointer field for showing a position of the first transmission descriptor; and a transmission descriptor arrangement field having a plural of the unit transmission descriptor as many as the transmission descriptor number fields.

3. The direct memory access apparatus according to claim 2, wherein the unit transmission descriptor comprises a source data address field; a destination data address field; a source data interval field; a destination data interval field; and a data length field.

4. The direct memory access apparatus according to claim 2, wherein the field of the variable transmission rule map unit is programmed by the main processor.

5. The direct memory access apparatus according to claim 1, wherein the direct memory access unit comprises a source start address register; a destination start address register; a source address generator; a destination address generator; and a transmission length register.

6. A direct memory access method using the direct memory access apparatus according to claim 1, wherein an operation of the direct memory access unit comprises steps of:
   (a) storing a start address of data line which is transmitted;
   (b) storing a start address of a memory position where the data line is stored; and
   (c) determining an actual address and sending the data line after receiving an increase unit and a transmission length of the address from a register storing the start address of the memory position.

7. A direct memory access method using the direct memory access apparatus according to claim 1, wherein an operation of the interface unit comprises steps of:
   (a) receiving a transmission command from the main processor after a transmission rule map is set by the main processor, and reading the number of the transmission descriptors from the transmission rule map unit;
   (b) reading a position of the first transmission rule descriptor;
   (c) initializing the transmission operation of the direct memory access unit;
   (d) setting a source and a destination register of the direct memory access unit by using a source and a destination start address setting which are read by the transmission rule descriptor;
   (e) setting the data elements number register which is read from the transmission rule map unit;
   (f) sending parameters read from the transmission rule descriptor to the direct memory access apparatus, and adding a corresponding parameter to the predetermined source and destination register value to update an address of a corresponding data line and setting a source data interval, a destination data interval, and data length;
   (g) determining on whether to exceed a count of number of data elements; and
   (h) determining on whether to exceed a count of number of the transmission descriptors in case the count of number of the data elements is exceeded.

8. The direct memory access method according to claim 7, wherein the (g) step repeats the setting of the source data interval and the destination data interval and the data length as many times as number of the data elements in case the count of number of the data elements is not exceeded.

9. The direct memory access method according to claim 7, wherein the (h) step comprises the steps of:
   terminating the operation of the interface when a count of number of the transmission descriptors is exceeded; and
   repeating the (c) step to the (h) step after reading a position of next transmission descriptor as many times as the predetermined number of the transmission descriptors in case the count of the number of the transmission descriptors is not exceeded.

10. A direct memory access method using a direct memory access apparatus for sending data stored in memory separately from an operation of a main processor, the direct memory access apparatus comprising:
    a variable transmission rule map unit for setting a transmission rule with a variable block length and a variable block interval as a unit of memory transmission rule;
    a direct memory access unit for sending data line of the variable block length and the variable block interval, in case of access to the unit of memory by using the unit of memory transmission rule determined by the variable transmission rule map unit; and
    an interface unit for retrieving the unit of memory transmission rule, which is necessary for sending the data line of the variable block length and the variable block interval, from the variable transmission rule map unit and sending the unit of memory transmission rule to the direct memory access unit;
    wherein an operation of the interface unit comprises steps of:
    (a) receiving a transmission command from the main processor after a transmission rule map is set by the main processor, and reading the number of the transmission descriptors from the transmission rule map unit;
    (b) reading a position of the first transmission rule descriptor;
    (c) initializing the transmission operation of the direct memory access unit;

(d) setting a source and a destination register of the direct memory access unit by using a source and a destination start address setting which are read by the transmission rule descriptor;

(e) setting the data elements number register which is read from the transmission rule map unit;

(f) sending parameters read from the transmission rule descriptor to the direct memory access apparatus, and adding a corresponding parameter to the predetermined source and destination register value to update an address of a corresponding data line and setting a source data interval, a destination data interval, and data length;

(g) determining on whether to exceed a count of number of data elements; and (h) determining on whether to exceed a count of number of the transmission descriptors in case the count of number of the data elements is exceeded.

11. A direct memory access method using a direct memory access apparatus for sending data stored in memory separately from an operation of a main processor, the direct memory access apparatus comprising:

a variable transmission rule map unit for setting a transmission rule with a variable block length and a variable block interval as a unit of memory transmission rule;

a direct memory access unit for sending data line of the variable block length and the variable block interval, in case of access to the unit of memory by using the unit of memory transmission rule determined by the variable transmission rule map unit; and an interface unit for retrieving the unit of memory transmission rule, which is necessary for sending the data line of the variable block length and the variable block interval, from the variable transmission rule map unit and sending the unit of memory transmission rule to the direct memory access unit;

wherein an operation of the interface unit comprises steps of:

(a) receiving a transmission command from the main processor after a transmission rule map is set by the main processor, and reading the number of the transmission descriptors from the transmission rule map unit;

(b) reading a position of the first transmission rule descriptor;

(c) initializing the transmission operation of the direct memory access unit;

(d) setting a source and a destination register of the direct memory access unit by using a source and a destination start address setting which are read by the transmission rule descriptor;

(e) setting the data elements number register which is read from the transmission rule map unit;

(f) sending parameters read from the transmission rule descriptor to the direct memory access apparatus, and adding a corresponding parameter to the predetermined source and destination register value to update an address of a corresponding data line and setting a source data interval, a destination data interval, and data length;

(g) determining on whether to exceed a count of number of data elements, and repeating the setting of the source data interval and the destination data interval and the data length as many times as number of the data elements in case the count of number of the data elements is not exceeded; and (h) determining on whether to exceed a count of number of the transmission descriptors in case the count of number of the data elements is exceeded.

12. A direct memory access method using a direct memory access apparatus for sending data stored in memory separately from an operation of a main processor, the direct memory access apparatus comprising:

a variable transmission rule map unit for setting a transmission rule with a variable block length and a variable block interval as a unit of memory transmission rule;

a direct memory access unit for sending data line of the variable block length and the variable block interval, in case of access to the unit of memory by using the unit of memory transmission rule determined by the variable transmission rule map unit; and an interface unit for retrieving the unit of memory transmission rule, which is necessary for sending the data line of the variable block length and the variable block interval, from the variable transmission rule map unit and sending the unit of memory transmission rule to the direct memory access unit;

wherein an operation of the interface unit comprises steps of:

(a) receiving a transmission command from the main processor after a transmission rule map is set by the main processor, and reading the number of the transmission descriptors from the transmission rule map unit;

(b) reading a position of the first transmission rule descriptor;

(c) initializing the transmission operation of the direct memory access unit;

(d) setting a source and a destination register of the direct memory access unit by using a source and a destination start address setting which are read by the transmission rule descriptor;

(e) setting the data elements number register which is read from the transmission rule map unit;

(f) sending parameters read from the transmission rule descriptor to the direct memory access apparatus, and adding a corresponding parameter to the predetermined source and destination register value to update an address of a corresponding data line and setting a source data interval, a destination data interval, and data length;

(g) determining on whether to exceed a count of number of data elements; and (h) determining on whether to exceed a count of number of the transmission descriptors in case the count of number of the data elements is exceeded;

(i) terminating the operation of the interface when a count of number of the transmission descriptors is exceeded; and (j) repeating the (c) step to the (h) step after reading a position of next transmission descriptor as many times as the predetermined number of the transmission descriptors in case the count of the number of the transmission descriptors is not exceeded.

* * * * *